United States Patent
Willett, Jr. et al.

(10) Patent No.: US 9,037,434 B2
(45) Date of Patent: May 19, 2015

(54) METHOD AND APPARATUS FOR OBTAINING DISCRETE AXIAL CLEARANCE DATA USING RADIAL CLEARANCE SENSORS

(75) Inventors: Fred Thomas Willett, Jr., Burnt Hills, NY (US); Emad Andarawis Andarawis, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 441 days.

(21) Appl. No.: 13/342,473

(22) Filed: Jan. 3, 2012

(65) Prior Publication Data
US 2013/0173213 A1    Jul. 4, 2013

(51) Int. Cl.
| | |
|---|---|
| G01B 7/00 | (2006.01) |
| G01B 7/14 | (2006.01) |
| F01D 11/14 | (2006.01) |
| F01D 17/02 | (2006.01) |
| F01D 21/00 | (2006.01) |
| F01D 11/08 | (2006.01) |
| F01D 21/04 | (2006.01) |
| G06F 19/00 | (2011.01) |
| F04D 29/66 | (2006.01) |

(52) U.S. Cl.
CPC . *G01B 7/14* (2013.01); *F01D 11/08* (2013.01); *F01D 21/04* (2013.01); *G06F 19/00* (2013.01); *F04D 29/66* (2013.01); *F01D 11/14* (2013.01); *F01D 17/02* (2013.01); *F01D 21/003* (2013.01); *F05D 2220/31* (2013.01)

(58) Field of Classification Search
CPC ....... G06F 19/00; G06F 15/00; Y02E 10/723; Y02E 10/721; Y02E 10/74; F01D 11/14; F01D 17/12; F01D 17/02; F01D 21/003; F01D 21/04; F05D 2220/30; G01B 7/14
USPC ......................................................... 702/155
See application file for complete search history.

(56) References Cited

U.S. PATENT DOCUMENTS

| | | |
|---|---|---|
| 4,063,167 A | 12/1977 | Duly |
| 4,813,273 A | 3/1989 | Parsons |
| 4,876,505 A | 10/1989 | Osborne |
| 5,070,302 A | 12/1991 | Marcus et al. |

(Continued)

FOREIGN PATENT DOCUMENTS

JP       2003042745 A       2/2003

OTHER PUBLICATIONS

Combined Search Report and Examination Report from GB Application No. 1222766.6 dated Mar. 15, 2013.

*Primary Examiner* — John Breene
*Assistant Examiner* — Eyob Hagos
(74) *Attorney, Agent, or Firm* — Ernest Cusick; Hoffman Warnick LLC

(57) ABSTRACT

A method and apparatus for determining axial clearance data between a rotor and a stator are disclosed. At least one radial clearance sensor is positioned on the stator and is configured to gather radial clearance data, i.e., measurements of a radial distance between the rotor and the stator taken at discrete time intervals. A computing device is operably connected with the at least one radial clearance sensor and is configured to use the radial clearance data to determine axial clearance data, i.e., an axial distance between the stator and the rotor. In one embodiment, the computing device uses, among other data points, an indication of a loss of signal from at least one radial clearance sensor to extrapolate the axial clearance data.

20 Claims, 4 Drawing Sheets

(56) References Cited

U.S. PATENT DOCUMENTS

| | | | |
|---|---|---|---|
| 5,166,626 A | 11/1992 | Hester et al. | |
| 5,572,119 A * | 11/1996 | Taylor | 324/207.16 |
| 5,627,761 A * | 5/1997 | Pollard | 700/279 |
| 6,665,589 B2 * | 12/2003 | Steingraeber | 700/279 |
| 6,848,193 B1 | 2/2005 | Kirzhner | |
| 7,333,913 B2 | 2/2008 | Andarawis et al. | |
| 7,891,938 B2 | 2/2011 | Herron et al. | |
| 2005/0212512 A1 * | 9/2005 | Matsuura et al. | 324/207.25 |
| 2006/0185445 A1 * | 8/2006 | Delcher et al. | 73/862.325 |
| 2006/0239813 A1 * | 10/2006 | Shah et al. | 415/119 |
| 2007/0005294 A1 * | 1/2007 | Andarawis et al. | 702/155 |
| 2012/0296593 A1 * | 11/2012 | Seccombe | 702/94 |

* cited by examiner

METHOD AND APPARATUS FOR OBTAINING DISCRETE AXIAL CLEARANCE DATA USING RADIAL CLEARANCE SENSORS

BACKGROUND OF THE INVENTION

The disclosure relates generally to turbomachines such as steam and gas turbines, and more particularly, to an apparatus and method for obtaining discrete axial clearance data using radial clearance sensors.

Turbomachines, such as gas and steam turbines, typically include a centrally-disposed rotor that rotates within a stator. A working fluid flows through one or more rows of circumferentially arranged rotating blades that extend radially outward from the rotor shaft. The fluid imparts energy to the shaft, which is used to drive a load such as an electric generator or compressor.

Clearance between radially outer tips of the rotating blades and stationary shrouds on an interior of the stator strongly impacts efficiency of a turbomachine. The smaller the clearance between the rotor blades and the inner surface of the stator, the lower the likelihood of fluid leakage across blade tips. Fluid leakage across blade tips causes fluid to bypass a row of blades, reducing efficiency. However, insufficient clearance is also problematic. Operating conditions may cause blades and other components to experience thermal expansion at different rates, which may result in variations in blade tip clearance. The specific effects of various operating conditions on blade clearance may vary depending on the type and design of a particular turbomachine. For example, tip clearances in gas turbine compressors may reach their nadir values when the turbine is shut down and cooled, whereas tip clearances in low pressure steam turbines may reach their nadir values during steady state full load operation. If insufficient tip clearance is provided when the turbomachine is assembled or re-assembled after inspection/repair, the rotating blades may hit the surrounding shroud, causing damage to the shroud on the stator interior, the blades, or both when operating under certain conditions.

Radial clearance in a turbomachine, e.g., a steam turbine, can be measured with hermetically sealed clearance sensors positioned on a stationary component. For example, the sensors can measure the gap between a tip of the sensor and a point on the rotating component by using sensors that have a voltage output that is indicative of the gap. The clearance can be determined by correlating voltage data, steam capacitance, and gap distance. During turbine operation, the rotating component and the stationary components will likely heat and cool at different rates, and therefore, the axial position of the clearance sensor, located on the stationary component, will move relative to the rotating component. Because of this relative movement, relatively large sensors with wide sensor tips are desired, to accommodate the axial movement. However, large sensors are often difficult to include in the relatively small areas available on the stationary component. Therefore, in practice, sensors are usually smaller than desired, and the entire range of differential axial motion is not covered. This results in a loss of signal, indicating that the differential rotor-stator axial movement has exceeded the axial range of the clearance sensor operation.

BRIEF DESCRIPTION OF THE INVENTION

A method and apparatus for determining axial clearance data between a rotor and a stator are disclosed. At least one radial clearance sensor is positioned on the stator and is configured to gather radial clearance data, i.e., measurements of a radial distance between the rotor and the stator taken at discrete time intervals. A computing device is operably connected with the at least one radial clearance sensor and is configured to use the radial clearance data to determine axial clearance data, i.e., an axial distance between the stator and the rotor. In one embodiment, the computing device uses, among other data points, an indication of a loss of signal from at least one radial clearance sensor to extrapolate the axial clearance data.

A first aspect of the disclosure provides an apparatus for determining axial clearance data between a rotor and a stator, the apparatus comprising: at least one radial clearance sensor positioned on the stator, the at least one radial clearance sensor configured to gather radial clearance data, wherein the radial clearance data comprises measurements of a radial distance between the rotor and the stator taken at discrete time intervals; and a computing device operably connected with the at least one radial clearance sensor, the computing device configured to use the radial clearance data to determine axial clearance data, wherein the axial clearance data comprises an axial distance between the stator and the rotor.

A second aspect of the disclosure provides a method of obtaining discrete axial clearance data, wherein axial clearance data comprises axial movement of a rotor with respect to a stator, the method comprising: obtaining radial clearance data from at least one radial clearance sensor, wherein the radial clearance data comprises a radial distance between the rotor and a stator over time; and using a computing device to use the radial clearance data to extrapolate the axial clearance data.

These and other aspects, advantages and salient features of the invention will become apparent from the following detailed description, which, when taken in conjunction with the annexed drawings, where like parts are designated by like reference characters throughout the drawings, disclose embodiments of the invention.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
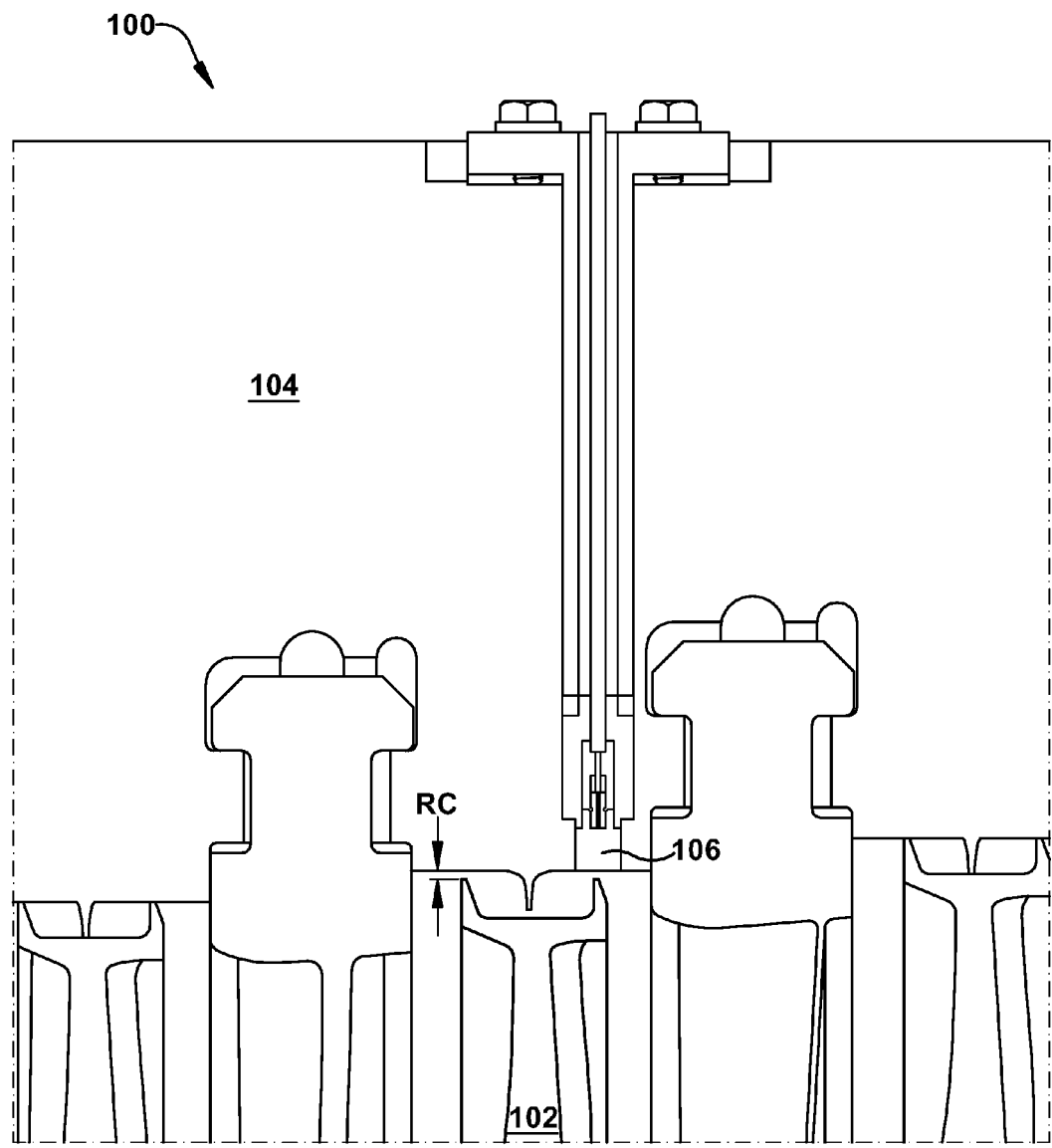
FIG. 1 shows cross-sectional view of a portion of a turbomachine, including a radial clearance sensor.

It is noted that the drawings of the invention are not necessarily to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

At least one embodiment of the present invention is described below in reference to its application in connection with the operation of a turbomachine. Although embodiments of the invention are illustrated relative to a turbomachine in the form of a steam turbine, it is understood that the teachings are equally applicable to other turbomachines, including but not limited to gas turbines. Further, at least one embodiment of the present invention is described below in reference to a nominal size and including a set of nominal dimensions. However, it should be apparent to those skilled in the art that the present invention is likewise applicable to any suitable turbine and/or generator. Further, it should be apparent to those skilled in the art that the present invention is likewise applicable to various scales of the nominal size and/or nominal dimensions.

Figure 4:
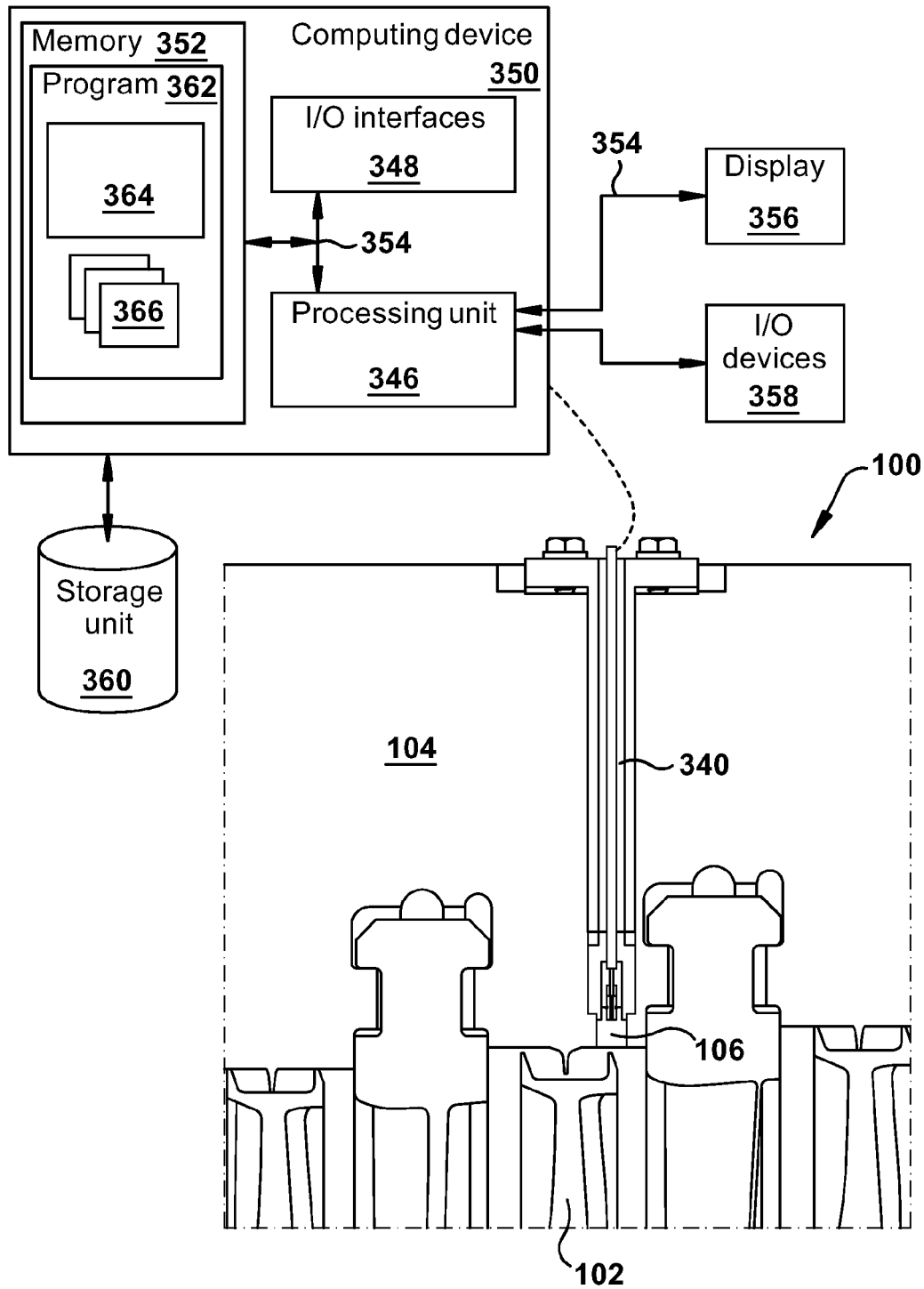
FIG. 4 shows a schematic of a system for obtaining discrete axial clearance data using radial clearance sensors.
Figure 5:
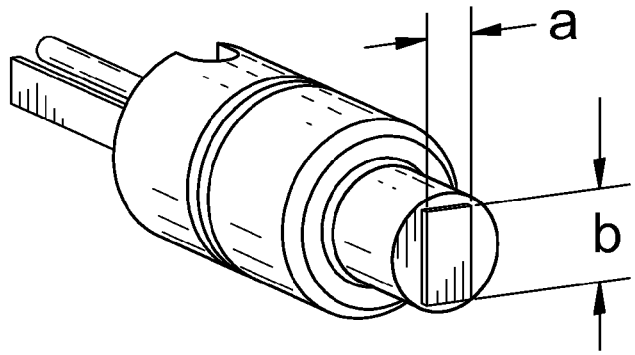
FIG. 5 shows a perspective view of an illustrative radial clearance sensor.
Figure 6:
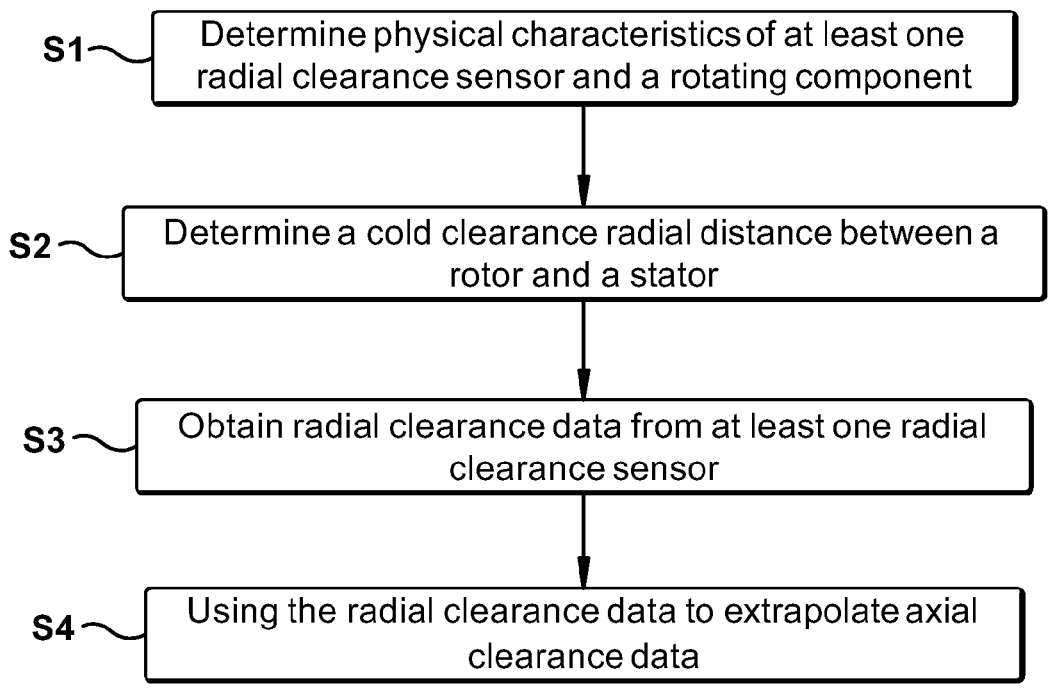
FIG. 6 shows a method for obtaining discrete axial clearance data using radial clearance sensors.

As indicated above, FIGS. 1-5 depict, and aspects of the invention provide, an apparatus for obtaining discrete axial clearance data using radial clearance sensors, and FIG. 6 depicts a method for obtaining discrete axial clearance data using radial clearance sensors.

As shown in FIG. 1, an apparatus 100 is disclosed for determining axial clearance data between a rotating component (rotor) 102 and a stationary component (stator) 104 in a turbomachine. As is known in the art, during turbine operation, rotor 102 and stator 104 heat and cool at different rates, and therefore a radial clearance between a rotor 102 and a stator 104 will vary during turbine operation.

Radial clearance (illustrated as distance RC in FIG. 1) in a steam turbine can be measured with a hermetically sealed clearance sensor 106, for example, a clearance sensor as described in U.S. Pat. Pub. No. US 2007/0005294. Sensors 106 can comprise any now known or later developed electromagnetic sensor configured to measure an electromagnetic property (e.g., electrical and/or optical) indicative of a clearance between a tip of radial clearance sensor 106 and a point on rotor 102. The electromagnetic property can comprise any measurable property indicative of a gap between two components, such as, but not limited to, capacitance, inductance, resistance, time-of-flight, and/or attenuation. In one example, sensors 106 can comprise capacitive clearance sensors having a voltage output that is indicative of the gap between a tip of the sensor and a point on rotor 102. The clearance can be determined by correlating voltage drop, steam capacitance, and gap distance.

Figure 2:
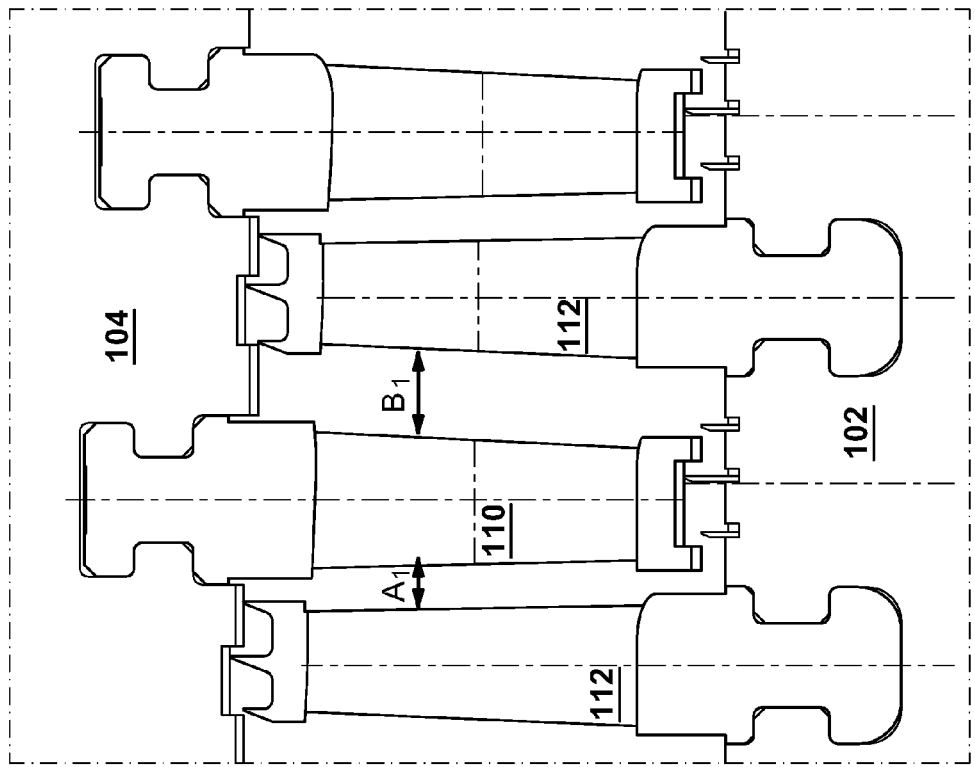
FIG. 2 shows a cross-sectional view of a rotor and a stator in a first position.
Figure 3:
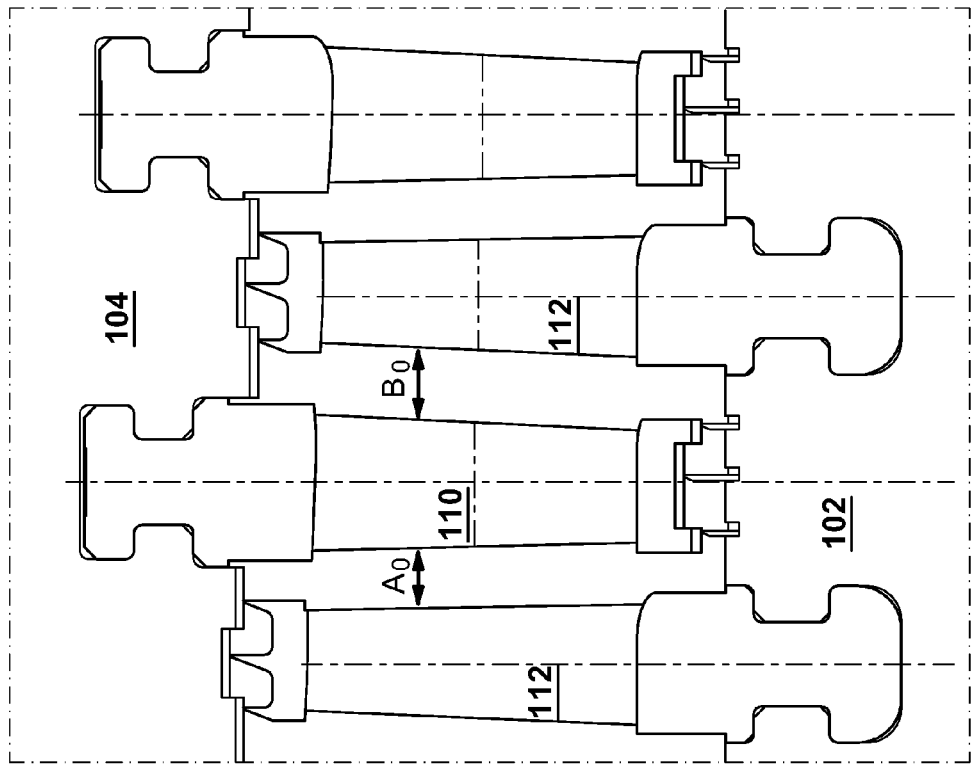
FIG. 3 shows a cross-sectional view of a rotor and a stator in a second position.

The relative movement of rotor 102 and stator 104 also means that the axial position of stator 104 moves relative to rotor 102. The range of motion is shown in FIGS. 2 and 3, and is exaggerated for illustrative purposes. As shown in FIG. 2, at start up, i.e., a cold clearance, an axial distance $A_0$ exists on one side of a stationary nozzle 110 on stator 104 and a first rotating bucket 112 on rotor 102, and an axial distance $B_0$ exists on the other side of stationary nozzle 110 on stator 104 and a second rotating bucket 112 on rotor 102. FIG. 3 shows these axial distances $A_1$ and $B_1$ once the turbomachine has started and the various components are heating up. As can be seen by comparing FIGS. 2 and 3, axial distance $A_1$ is smaller than axial distance $A_0$, indicating that stationary nozzle 110 is closer to the first rotating bucket 112 during operation than at cold clearance, while axial distance $B_1$ is larger than axial distance $B_0$, indicating that stationary nozzle 110 is farther away from the second rotating bucket 112 during operation than at cold clearance.

According to embodiments of this invention, as shown in FIG. 1, at least one radial clearance sensor 106 is positioned on stator 104. As shown in FIG. 1, in one embodiment, a radial clearance sensor 106 can be substantially vertically aligned with a longitudinal axis of rotor 102. Sensor 106 is configured to gather radial clearance data, such as measurements of a radial distance between rotor 102 and stator 104 taken at discrete time intervals. It is understood that clearance sensor 106 may comprise a plurality of clearance sensors 106. In one embodiment, clearance sensors 106 are separated by two stages of blades. In other embodiments, between about three (3) and about six (6) clearance sensors 106 may be axially spaced along stator 104. In further embodiments, a plurality of clearance sensors 106 may be arranged such that one clearance sensor 106 is axially aligned with each of a plurality of stages of blades on rotor 102. In such an embodiment, the number of clearance sensors 106 may be equal to the number of stages of blades on rotor 102. In other arrangements, one clearance sensor 102 may be axially aligned with every other stage of blades on rotor 102, such that the number of clearance sensors 106 may be equal to half of the number of stages of blades on rotor 102. In another arrangement, a plurality of clearance sensors 106 may be axially aligned with each stage of blades on rotor 102. These arrangements are merely illustrative, however; other arrangements of clearance sensors 106 relative to stages of blades on rotor 102 are contemplated as other embodiments of the invention.

As shown in FIG. 4, system 100 further includes a computing device 350 operably connected with sensor 106. For example, clearance sensor 106 may be in signal communication with computing device 350 via clearance sensor instrumentation leads 340. It is understood that computing device 350 can be operably connected to sensor(s) 106 via any wired or wireless configuration. Computing device 350 is configured to use radial clearance data to determine axial clearance data, i.e., an axial distance between sensor 106 on stator 104 and rotor 102, as discussed in more detail herein.

Upon measuring a radial clearance, $C_R$, clearance sensor 106 may transmit a signal representing the radial clearance $C_R$ to computing device 350. As shown in FIG. 4, computing device 350 includes a processing unit 346, a memory 352, and input/output (I/O) interfaces 348 operably connected to one another by pathway 354, which provides a communications link between each of the components in computing device 350. Further, computing device 350 is shown in communication with display 356, external I/O devices/resources 358, and storage unit 360. I/O resources/devices 358 can comprise one or more human I/O devices, such as a mouse, keyboard, joystick, numeric keypad, or alphanumeric keypad or other selection device, which enable a human user to interact with computing device 350 and/or one or more communications devices to enable a device user to communicate with computing device 350 using any type of communications link.

In general, processing unit 346 executes computer program code 362 which provides the functions of computing device 350. Modules, such as predictive modeling module 364, which is described further herein, are stored in memory 352 and/or storage unit 360, and perform the functions and/or steps of the present invention as described herein. Memory 352 and/or storage unit 360 can comprise any combination of various types of computer readable data storage media that reside at one or more physical locations. To this extent, storage unit 360 could include one or more storage devices, such as a magnetic disk drive or an optical disk drive. Still further, it is understood that one or more additional components not shown in FIG. 4 can be included in computing device 350. Additionally, in some embodiments one or more external devices 358, display 356, and/or storage unit 360 could be contained within computing device 350, rather than externally as shown, in the form of a computing device 350 which may be portable and/or handheld.

Computing device 350 can comprise one or more general purpose computing articles of manufacture capable of executing program code, such as program 362, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, program 362 can be embodied as any combination of system software and/or application software.

Further, program 362 can be implemented using a module such as predictive modeling module 364 or set of modules 366. In this case, predictive modeling module 364 can enable computing device 350 to perform a set of tasks used by program 362, and can be separately developed and/or implemented apart from other portions of program 362. As used herein, the term "component" means any configuration of hardware, with or without software, which implements the functionality described in conjunction therewith using any solution, while the term "module" means program code that enables a computing device 350 to implement the actions described in conjunction therewith using any solution. When fixed in memory 352 or storage unit 360 of a computing device 350 that includes a processing unit 346, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of computing device 350.

When computing device 350 comprises multiple computing devices, each computing device can have only a portion of program 362 fixed thereon (e.g., one or more modules 364, 366). However, it is understood that computing device 350 and program 362 are only representative of various possible equivalent computer systems that may perform a process described herein. To this extent, in other embodiments, the functionality provided by computing device 350 and program 362 can be at least partially implemented by one or more computing devices that include any combination of general and/or specific purpose hardware with or without program code, including but not limited to a handheld measuring device for stator-to-rotor clearance. In each embodiment, the hardware and program code, if included, can be created using standard engineering and programming techniques, respectively.

When computing device 350 includes multiple computing devices, the computing devices can communicate over any type of communications link. Further, while performing a process described herein, computing device 350 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

As noted, computing device 350 includes a predictive modeling module 364 for analyzing a signal provided by radial clearance sensor 106 and determining axial clearance data. Computing device 350 uses, among other things, signals from sensor 106 comprising radial clearance data to enable correlation of predictive models to determine axial clearance data. Predictive models may be embodied in tables, data structures, neural networks, etc., which can allow an axial clearance to be calculated from a set of inputted data that includes the radial clearance data from sensors 106. The set of inputted data can include data inputted directly through I/O devices 358 by a user, as well as a set of data received from sensor(s) 106.

In one embodiment, the set of inputted data can include at least one of the following data points which computing device 350 can use to determine the axial clearance data: a width of radial clearance sensor 106, a center line of rotor 120, and an indication of a loss of signal from radial clearance sensor 106. For example, assuming a width of a sensor 106 is known, and assuming a center line of rotor 120 is known, when a sensor 106 loses a signal, computing device 350 can extrapolate how much axial movement has occurred between stator 104 and rotor 102. In other words, when sensor 106 loses a signal, i.e., rotor 102 is no longer radially aligned with stator 104, computing device 350 can determine how far rotor 102 must have axially moved with respect to stator 104 because computing device 350 knows the starting positions of the turbomachine components, and the dimensions of sensor 106. This axial movement changes the axial clearance from the cold clearance value 'x' to an operating value 'x+dx'. For example, if the sensor 106 loses signal after relative motion of 0.100", it can be extrapolated that, at that point in time, the axial clearance is the cold clearance plus 0.100".

This method of measuring axial clearance is shown in FIG. 6. In S1, characteristics of a radial clearance sensor are determined, e.g., dimensions of the sensor, as well as characteristics of the rotor, e.g., a center line. Next, in S2, a cold radial clearance is determined between the rotor and the stator. Then, in S3, radial clearance data is obtained from at least one radial clearance sensor. As discussed herein, this data can be taken continuously, or a discrete time intervals, or at any desired point in time. In S4, the radial clearance data is used to extrapolate axial clearance data.

An example of a sensor 106 is shown in FIG. 5, showing a rectangular sensor tip defined by dimensions 'a' and 'b'. Dimension 'b' is aligned with the axis of the turbomachine, and is selected to enable clearance measurement during all turbomachine operation. If the available space for a clearance sensor is limited, one alternative is to reduce dimension 'b' such that an entire range of differential axial motion is not covered. This will necessarily result in a loss of signal from the clearance sensor because once rotor 102 moves far enough away from stator 104, clearance sensor 106 will not be able to measure the radial distance between stator 104 and rotor 102 anymore. In other words, a loss of signal is an indication that the differential rotor-stator axial movement has exceeded the range of clearance sensor operation enabled by dimension 'b'.

However, as discussed herein, the loss of radial clearance data provides information that can be used to predict an axial clearance. Signal loss from radial clearance sensor 106 means that clearance sensor 106 is no longer over the tip of rotor blade 112. Since time, temperature, and other parameters are also typically measured, this information can be used to correlate models of transient turbine behavior and improve predictive methods.

In one embodiment, multiple sensors 106 are used, axially positioned such that at least one sensor 106 is collecting radial clearance data at any given time and the loss of signal from any sensor 106 can be used to determine axial clearance. In this embodiment, the loss of radial signal from one sensor 106, but not from others, indicates that the signal loss is due to relative axial motion and not a sudden large increase in radial clearance.

One way to improve differentiation between loss of signal due to axial motion and loss of signal due to excessive radial motion is to understand the range of expected radial clearances and ensure that sensor 106 is capable of measuring clearances in the predicted range. Another approach is to use a plurality of radial clearance sensors 106 at a given turbine stage, arranged circumferentially around rotor 102 and staggered slightly axially so that the loss of signal occurs at a different position for each sensor 106. Another alternative is to place sensors 106 in adjacent or nearby stages, but offset them slightly relative to the predicted axial movement so that radial clearance data is collected on one stage while its neighbor is axially out of range.

In another embodiment, a radial clearance sensor 106 can include an electromagnetic field shaping element such as an extended shield surrounding a tip of radial clearance sensor 106 to limit a field of view of radial clearance sensor 106. An electromagnetic field shaping element, such as an extended shield, can sharpen the signal pattern created when the radial clearance sensor 106 is out of axial range (and indicating a particular axial clearance). Extending the shield around the tip will "focus" the sensor's field of view, and will reduce the fringe field. This extended shield can be a shield attached to a sensor that has its tip flush with a surface of stator 104, or a similar affect can be achieved by recessing the tip of a sensor 106 into a surface of stator 104.

As previously mentioned and discussed further herein, the system for measuring axial clearance, including clearance sensor 106, has the technical effect of enabling measurement of axial clearance data using radial clearance sensor 106. The systems and embodiments discussed herein allow a clearance sensor 106 with sub-optimal axial range to be used, allowing sensors to be smaller and, hence, easier to accommodate in the turbine stator hardware. In addition to being compact and easier to accommodate, the sensors 106 provide discrete, i.e., non-continuous, data for the determination and improved prediction of axial clearances.

As used herein, the terms "first," "second," and the like, do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the stated value and has the meaning dictated by the context (e.g., includes the degree of error associated with measurement of the particular quantity). The suffix "(s)" as used herein is intended to include both the singular and the plural of the term that it modifies, thereby including one or more of that term (e.g., the metal(s) includes one or more metals). Ranges disclosed herein are inclusive and independently combinable (e.g., ranges of "up to about 6, or, more specifically, about 3 to about 6 sensors," is inclusive of the endpoints and all intermediate values of the ranges of "about 3 to about 6," etc.).

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for determining axial clearance data between a rotor and a stator, the apparatus comprising:
    at least one radial clearance sensor positioned on the stator, the at least one radial clearance sensor configured to gather radial clearance data,
        wherein the radial clearance data include measurements of a radial distance between the rotor and the stator taken at discrete time intervals and an indication of a loss of radial clearance signal from the at least one radial clearance sensor,
        wherein the loss of radial clearance signal indicates that an axial movement of the rotor relative to the stator has exceeded a range of the clearance sensor; and
    a computing device operably connected with the at least one radial clearance sensor, the computing device configured to determine axial clearance data based on a width of the at least one radial clearance sensor, a center line of the rotor, and the radial clearance data.

2. The apparatus of claim 1, wherein the at least one radial clearance sensor comprises a plurality of radial clearance sensors circumferentially spaced around the rotor.

3. The apparatus of claim 1, wherein the at least one radial clearance sensor comprises a plurality of radial clearance sensors axially spaced along the stator such that one radial clearance sensor is axially aligned with each of a plurality of stages of rotor blades.

4. The apparatus of claim 1, wherein the at least one radial clearance sensor comprises a plurality of radial clearance sensors axially spaced along the stator such that a plurality of radial clearance sensors are axially aligned with each of a plurality of stages of rotor blades.

5. The apparatus of claim 1, wherein the at least one radial clearance sensor comprises an electromagnetic sensor configured to measure an electromagnetic property indicative of a clearance between a tip of the radial clearance sensor and a point on the rotor; wherein the electromagnetic property comprises at least one of: capacitance, inductance, resistance, time-of-flight, and attenuation.

6. The apparatus of claim 1, wherein the at least one radial clearance sensor is substantially vertically aligned with a longitudinal axis of the rotor.

7. The apparatus of claim 1, wherein the at least one radial clearance sensor includes an electromagnetic field shaping element.

8. The apparatus of claim 7, wherein the electromagnetic field shaping element comprises an extended shield surrounding a tip of the radial clearance sensor to limit a field of view of the radial clearance sensor.

9. The apparatus of claim 1, wherein a tip of the at least one radial clearance sensor is either: flush with a surface of the stator, or recessed into a surface of the stator.

10. A method of obtaining discrete axial clearance data, wherein axial clearance data comprises axial movement of a rotor with respect to a stator, the method comprising:
    obtaining radial clearance data from at least one radial clearance sensor, wherein the radial clearance data include a measurement of a radial distance between the rotor and a stator taken at a discrete time interval and an indication of a loss of radial clearance signal from the at least one radial clearance sensor, wherein the loss of radial clearance sensor signal indicates that an axial movement of the rotor relative to the stator has exceeded a range of the clearance sensor; and using a computing device, determining the axial clearance data based on a width of the at least one radial clearance sensor, a center line of the rotor, and the radial clearance data.

11. The method of claim 10, wherein the at least one radial clearance sensor comprises a plurality of radial clearance sensors circumferentially spaced around the rotor.

12. The method of claim 10, wherein the at least one radial clearance sensor comprises a plurality of radial clearance sensors axially spaced along the stator such that one radial clearance sensor is axially aligned with each of a plurality of stages of rotor blades.

13. The method of claim 10, wherein the at least one radial clearance sensor comprises a plurality of radial clearance sensors axially spaced along the stator such that a plurality of radial clearance sensors are axially aligned with each of a plurality of stages of rotor blades.

14. The method of claim 10, wherein the at least one radial clearance sensor comprises an electromagnetic sensor configured to measure an electromagnetic property indicative of a clearance between a tip of the radial clearance sensor and a point on the rotor; wherein the electromagnetic property comprises at least one of: capacitance, inductance, resistance, time-of-flight, and attenuation.

15. The method of claim 10, wherein the at least one radial clearance sensor is substantially vertically aligned with a longitudinal axis of the rotor.

16. The method of claim 10, wherein the at least one radial clearance sensor includes an electromagnetic field shaping element.

17. The method of claim 16, wherein the electromagnetic field shaping element comprises an extended shield surrounding a tip of the radial clearance sensor to limit a field of view of the radial clearance sensor.

18. The method of claim 10, wherein a tip of the at least one radial clearance sensor is either: flush with a surface of the stator, or recessed into a surface of the stator.

19. The apparatus of claim 2, wherein the plurality of circumferentially spaced radial clearance sensors are axially spaced such that:

the plurality of radial clearance sensors are at least partially axially aligned with a single stage of rotor blades, and the plurality of radial clearance sensors are axially staggered with respect to each other radial clearance sensor so that the indication of the loss of signal from each of the plurality of radial clearance sensors occurs at a different axial position of the rotor for each of the plurality of radial clearance sensors.

20. The apparatus of claim 2, wherein the plurality of circumferentially spaced radial clearance sensors are axially spaced such that:

each of the plurality of radial clearance sensors is at least partially axially aligned with a different respective stage of rotor blades, and the plurality of radial clearance sensors are axially staggered with respect to the respective stage of rotor blades, so that the indication of the loss of signal from each of the plurality of radial clearance sensors occurs at a different axial position of the rotor for each of the plurality of radial clearance sensors.

* * * * *